United States Patent
Cao et al.

(10) Patent No.: US 8,520,418 B2
(45) Date of Patent: Aug. 27, 2013

(54) POWER SOURCE CIRCUIT EFFICIENT IN CONVERSION FROM ALTERNATING CURRENT TO DIRECT CURRENT

(75) Inventors: Xiao-Feng Cao, Shenzhen (CN); Hui Li, Shenzhen (CN)

(73) Assignees: Hong Fu Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 313 days.

(21) Appl. No.: 13/157,321

(22) Filed: Jun. 10, 2011

(65) Prior Publication Data
US 2012/0188809 A1    Jul. 26, 2012

(30) Foreign Application Priority Data
Jan. 20, 2011    (CN) .......................... 2011 1 0022773

(51) Int. Cl.
*H02M 1/00*    (2007.01)
*H02H 7/125*    (2006.01)

(52) U.S. Cl.
USPC ................................ 363/49; 363/52; 363/126

(58) Field of Classification Search
USPC ............................................. 363/49, 52, 126
See application file for complete search history.

(56) References Cited

U.S. PATENT DOCUMENTS

| | | | |
|---|---|---|---|
| 4,910,654 A * | 3/1990 | Forge | 363/49 |
| 5,450,307 A * | 9/1995 | Yasumura | 363/47 |
| 5,627,738 A * | 5/1997 | Lubomirsky et al. | 363/49 |
| 5,920,186 A * | 7/1999 | Ninh et al. | 363/49 |
| 5,994,684 A * | 11/1999 | Ko | 219/721 |
| 6,388,902 B1 * | 5/2002 | Yasumura | 363/49 |
| 2004/0090807 A1 * | 5/2004 | Youm | 363/132 |

* cited by examiner

*Primary Examiner* — Jue Zhang
(74) *Attorney, Agent, or Firm* — Altis Law Group, Inc.

(57) ABSTRACT

A power source circuit which includes input portions, a limiting resistor connected to one of the input portions, a rectifier connected to the limiting resistor, a sampling resistor connected to the rectifier, output portions connected to the rectifier, a control circuit, and a switch circuit connected to the control circuit. The control circuit is connected to the two ends of the sampling resistor and the switch circuit is connected to the two ends of the limiting resistor. The control circuit is configured to output a first signal to the switch circuit if the current in the sampling resistor is greater than a predetermined value. The predetermined value is less than the level of current being consumed by a load in normal operation. The switch circuit is configured to isolate the sampling resistor when the first signal is received.

8 Claims, 1 Drawing Sheet

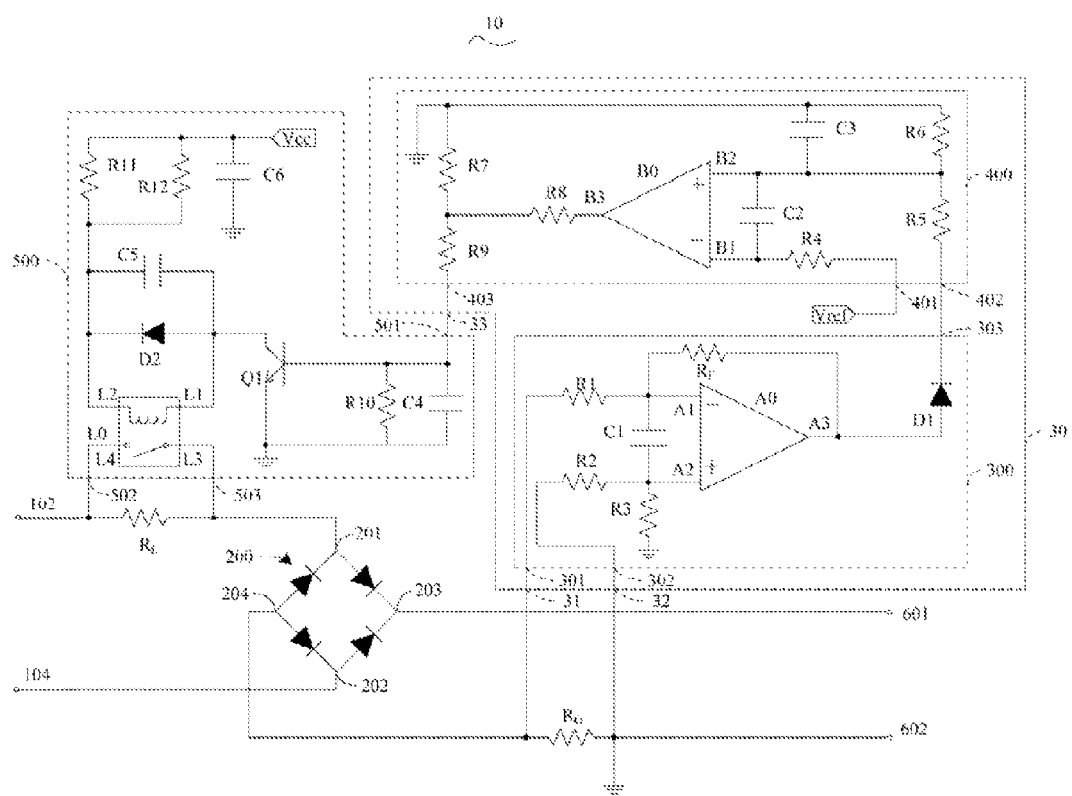

POWER SOURCE CIRCUIT EFFICIENT IN CONVERSION FROM ALTERNATING CURRENT TO DIRECT CURRENT

BACKGROUND

1. Technical Field

The present disclosure relates to power source circuits and, particularly, to a power source circuit having high efficiency in converting alternating current (AC) to direct current (DC).

2. Description of Related Art

Power source circuits generally include a rectifier. The rectifier is used to connect to an external AC power source, such as a 220 volts (V) and 50 Hertz (Hz) AC power source. The rectifier rectifies the AC current and outputs DC current to a load. At the moment that the AC power source is connected, inrush current that may exceed the rated current of the load flows into the load, which may damage the load. To reduce strength of the inrush current, a resistor is usually employed and connected between the AC power source and the rectifier. However, when the load is in operation, the resistor consumes energy and converts it into heat, which is useless or may even be harmful. The conversion efficiency of the power source circuit is reduced.

Therefore, it is desirable to provide a power source circuit which can overcome the above-mentioned limitations.

BRIEF DESCRIPTION OF THE DRAWING

Many aspects of the present disclosure should be better understood with reference to the drawing. The components in the drawing are not necessarily drawn to scale, the emphasis instead being placed upon clearly illustrating the principles of the present disclosure.

The FIGURE is a schematic view of a power source circuit, in accordance with an exemplary embodiment.

DETAILED DESCRIPTION

Embodiments of the present disclosure will now be described in detail with reference to the FIGURE.

Referring to the FIGURE, a power source circuit 10, according to an exemplary embodiment, includes a first input terminal 102, a second input terminal 104, a limiting resistor RL, a rectifier 200, a sampling resistor RG, a control circuit 30, a switch circuit 500, a first output terminal 601, a second output terminal 602 connected to the ground, an operating voltage source Vcc having an operating voltage, and a reference voltage source Vref having a reference voltage.

The first input terminal 102 and the second input terminal 104 are connected to an external AC power source, such as a 220 V and 50 Hz AC power. The rectifier 200 includes a first node 201, a second node 202, a third node 203, and a fourth node 204. The first node 201 is connected to the first input terminal 102 through the limiting resistor RL. The second node 202 is connected to the second input terminal 104. The third node 203 is connected to the first output terminal 601. The fourth node 204 is connected to the second output terminal 602 through the sampling resistor RG. The rectifier 200 converts the AC current from the external AC power source into a DC current and outputs the DC current from the first output terminal 601 and the second output terminal 602. In the present disclosure, the rectifier 200 is a bridge rectifier.

The control circuit 30 includes a first sampling input node 31, a second sampling input node 32 and a control output node 33. The first sampling input node 31 and the second sampling input node 32 are respectively connected the two ends of the sampling resistor RG. The control circuit 30 is configured to output a first control signal via the control output node 33 when the DC current is greater than a predetermined value and to output a second control signal via the control output node 33 when the DC current is less than or equal to the predetermined value. The predetermined value is less than a current value of a load connected to the power source circuit 10 when operating normally. In the present disclosure, the control circuit 30 includes an amplifying circuit 300 and a comparison circuit 400.

The amplifying circuit 300 includes a first amplifying input node 301, a second amplifying input node 302, and an amplifying output node 303. The first amplifying input node 301 is connected to the first sampling input node 31. The second amplifying input node 302 is connected to the second sampling input node 32. The amplifying circuit 300 is used for amplifying a voltage drop between the first amplifying input node 301 and the second amplifying input node 302 and outputting an amplified voltage via the amplifying output node 303.

In the present disclosure, the amplifying circuit 300 includes an amplifier A0, a first resistor R1, a second resistor R2, a third resistor R3, a feedback resistor RF, a first capacitor C1, and a first diode D1. The amplifier A0 includes a first reversal input A1, a first positive input A2, and a first output node A3. The first reversal input A1 is connected to the first amplifying input node 301 through the first resistor R1. The first positive input A2 is connected to the second amplifying input node 302 through the second resistor R2. The first positive input A2 is also connected to the ground through the third resistor R3. The first capacitor C1 is connected between the first reversal input A1 and the first positive input A2. The first output node A3 is connected to the first reversal input A1 through the feedback resistor RF. The first output node A3 is also connected the anode of the first diode D1. The cathode of the first diode D1 is connected to the amplifying output node 303.

The comparison circuit 400 includes a first comparison input node 401, a second comparison input node 402, and a comparison output node 403. The first comparison node 401 is connected to the reference voltage source Vref. The second comparison input node 402 is connected to the amplifying output node 303. The comparison output node 403 is connected to the control output node 33. The comparison circuit 400 is used to compare the voltage of the first comparison input node 401 to that of the second comparison input node 402. The comparison circuit 400 is also used to output the first control signal when the voltage of the second comparison input node 402 is greater than that of the first comparison input node 401 and output the second control signal when the voltage of the second comparison input node 402 is less than or equal to that of the first comparison input node 401.

In the present disclosure, the comparison circuit 400 includes a comparator B0, resistors R4-R9, a second capacitor C2, and a third capacitor C4. The comparator B0 includes a second reversal input node B1, a second positive input node B2, and a second output node B3. The second reversal input node B1 is connected to the first comparison input node 401 through the fourth resistor R4. The second positive input node B2 is connected the second comparison input node 402 through the fifth resistor R5. The second capacitor C2 is connected between the second reversal input node B1 and the second positive input node B2. The third capacitor C3 and the sixth resistor R6 are connected in parallel between the second positive input node B2 and the ground. The seventh resistor R7 and the ninth resistor R9 are connected between the comparison output node 403 and the ground. The second output node B3 is connected to the junction of the seventh resistor R7 and the ninth resistor R9 via the eighth resistor R8.

The switch circuit 500 includes a control input node 501, a first connection node 502, and a second connection node 503. The control input node 501 is connected to the control output node 33. The first connection node 502 and the second connection node 503 are respectively connected to the two ends of the limiting resistor RL. The switch circuit 500 is configured to short-circuit the first connection node 502 and the second connection node 503 when receives the first control signal from the control circuit 30 and disconnect the first connection node 502 and the second connection node 503 when receives the second control signal from the control circuit 30.

In the present disclosure, the switch circuit 500 includes a transistor Q1, a relay L0, a second diode D2, capacitors C4-C7, and resistors R10-R12. The relay L0 includes a first relay node L1, a second relay node L2, a third relay node L3, and a fourth relay node L4. The third relay node L3 is connected to the fourth relay node L4 when the first relay node L1 and the second relay node L2 are connected between the operating voltage and the ground. The base of the transistor Q1 is connected to the control input node 501. The emitter of the transistor Q1 is connected to the ground. The tenth resistor R10 and the fourth capacitor C4 are connected in parallel between the control input node 501 and the ground. The collector of the transistor Q1 is connected to the first relay node L1. The second relay node L2 is connected to the operating voltage source Vcc through the eleventh resistor R11 and the twelfth resistor R12 in parallel. The anode of the second diode D2 is connected to the collector of the transistor Q1. The cathode of the second diode D2 is connected to the first relay node L1. The two ends of the fifth capacitor C5 are respectively connected to the anode and the cathode of the second diode D2. The sixth capacitor C6 is connected between the operating voltage source Vcc and the ground. The third relay node L3 is connected to the second connection node 503. The fourth relay node L4 is connected to the first connection node 502.

In operation, the first output terminal 601 and the second output terminal 602a are connected to a load (not shown). When the load is operating, AC current flows through the limiting resistor RL and DC current flows into the load via the sampling resistor RG. The voltage drop between two ends of the sampling resistor RG is amplified by the amplifying circuit 300. The amplifying circuit 300 then outputs an amplified voltage via the amplifying output node 303 to the comparison circuit 400. The comparison circuit 400 compares the amplified voltage to the reference voltage. The reference voltage is determined according to the value of the DC current that flows through the sampling resistor RG, the resistance of the sampling resistor RG, and the amplification factor of the amplifying circuit 300. Generally, the reference voltage is less than the output of the amplifying circuit 300 when the load is operating normally. As such, when the load operates normally, the current being consumed by the load is greater than the predetermined value and the output of the amplifying circuit 300 is greater than the reference voltage, therefore, the comparison circuit 400 outputs a high level voltage (the first control signal) from the comparison output node 403 to the switch circuit 500. Thereby, the transistor Q1 is turned on, with the result that the first relay node L1 and the second relay node L2 are connected between the operating voltage and the ground. Thus, the third relay node L3 is connected to the fourth relay node L4 and the limiting resistor RL is short-circuited. As such, during the normal operation of the load, the limiting resistor RL consumes substantially no energy, which improves the AC to DC conversion efficiency of the power source circuit 10.

In the event that, for example, the resistance value of the limiting resistor RL is 15 ohms, the resistance value of the sampling resistor RG is 1 ohm, and a load with a power consumption of 500 W is connected to the power source circuit 10, the AC current flowing through the limiting resistor RL is approximately 1.3 A when the load operates normally. That means the limiting resistor RL will consume approximately 26 W if power is allowed to flow through it. In the present disclosure, the power consumption of the sampling resistor RG is approximately 1.7 W, the power consumption of the control circuit 30 is approximately 1 W, and the power consumption of the switch circuit 500 is approximately 1 W. Therefore, the power source circuit 10 of the present disclosure saves approximately 22 W per hour and the conversion efficiency is also improved.

When the load is switched off or if no load is connected to the power source circuit 10, the comparison circuit 400 outputs a low level voltage (the second control signal) to the switch circuit 500, with the result that the transistor Q1 is turned off and the third relay node L3 is disconnected from the fourth relay node L4. Therefore, the limiting resistor RL is in place and functioning between the AC power source and the rectifier 200 for inhibiting the inrush current when the load is switched on or otherwise starts to operate.

When providing power for devices that need a continuous power supply, such as servers, there is usually two of the power source circuit 10, one being used for backup. When a server is in operation, a power source circuit 10 operates normally, while the other operates in a standby mode with small standby-current flowing therethrough. In this situation, the predetermined value can be less than the standby-current. As such, power will not flow through the limiting resistor RL of the standby power source circuit 10 and this will save power consumption.

It will be understood that the above particular embodiments is shown and described by way of illustration only. The principles and the features of the present disclosure may be employed in various and numerous embodiment thereof without departing from the scope of the disclosure as claimed. The above-described embodiments illustrate the scope of the disclosure but do not restrict the scope of the disclosure.

What is claimed is:

1. A power source circuit, comprising:
    a first input terminal;
    a second input terminal cooperating with the first input terminal for connecting to an external AC power;
    a first output terminal;
    a second output terminal connected to ground;
    a limiting resistor;
    a sampling resistor;
    a rectifier comprising a first node, a second node, a third node, and a fourth node, wherein the first node is connected to the first input terminal through the limiting resistor, the second node is connected to the second input terminal, the third node is connected to the first output terminal, the fourth node is connected to the second output terminal through the sampling resistor; the rectifier is configured to convert the AC current from the external AC power to a DC current and output the DC current from the first output terminal and the second output terminal;
    a control circuit comprising two sampling input nodes respectively connected the two ends of the sampling resistor and a control output node, wherein the control circuit is configured to output a first control signal via the control output node when the DC current is greater than a predetermined value and output a second control signal via the control output node when the DC current is less than or equal to the predetermined value, wherein the predetermined value is less than a current value of a load connected to the power source circuit and operating normally; and a switch circuit comprising a control input node connected to the control output node and two connection nodes respectively connected to the two ends of the limiting resistor, wherein the switch circuit is configured to short-circuit the two connection nodes when receiving the first control signal and disconnect the two connection nodes when receiving the second control signal.

2. The power source circuit of claim 1, wherein the control circuit comprises an amplifying circuit and a comparison circuit; the amplifying circuit comprises a first amplifying input node, a second amplifying input node, and an amplifying output node, the first amplifying input node and the second amplifying input node are respectively connected to the two sampling input node, the amplifying circuit is used for amplifying a voltage drop between the first amplifying input node and the second amplifying input node and outputting an amplified voltage via the amplifying output node; the comparison circuit comprises a first comparison input node that is connected to a reference voltage source, a second comparison input node that is connected to the amplifying output node, and a comparison output node that is connected to the control output node, the reference voltage source has a reference voltage, the comparison circuit is used to compare the voltage of the first comparison input node to that of the second comparison input node, the comparison circuit is also used to output the first control signal when the voltage of the second comparison input node is greater than that of the first comparison input node and output the second control signal when the voltage of the second comparison input node is less than or equal to that of the first comparison input node.

3. The power source circuit of claim 2, wherein the amplifying circuit comprises an amplifier and a feedback resistor, the amplifier comprises a first reversal input, a first positive input, and a first output node, the first reversal input is connected to an end of the sampling resistance that is connected to the rectifier, the first positive input node is connected to the other end of the sampling resistance that is connected to the second output terminal, the first output node is connected to the first reversal input, the first output node is also connected the amplifying output node.

4. The power source circuit of claim 3, wherein amplifying circuit further comprises a first resistor, a second resistor, a third resistor, a first capacitor, and a first diode; the first resistor is connected between the first reversal input and the sampling resistor, the second resistor is connected between the first positive input and the sampling resistor, the third resistor is connected between the first positive input node and the ground, the anode of the first diode is connected to the first output node, the cathode of the first diode is connected to the amplifying output node.

5. The power source circuit of claim 2, wherein the comparison circuit comprises a comparator, the comparator comprises a second reversal input node, a second positive input node, and a second output node, the second reversal input node is connected to the first comparison input node, the second positive input node is connected to the second comparison input node, second output node is connected to the comparison output node.

6. The power source circuit of claim 5, wherein the comparison circuit further comprises a fourth resistor to a ninth resistor, a second capacitor, and a third capacitor; the fourth resistor is connected between the second reversal input node and the first comparison input node, the fifth resistor is connected between the second positive input node and the second comparison input node, the second capacitor is connected between the second reversal input node and the second reversal input node, the third capacitor and the sixth resistor are connected between the second positive input node and the ground in parallel, the seventh resistor and the ninth resistor are connected between the comparison output node and the ground, the seventh resistor is connected between the second output node and a connection between and the ninth resistor and the eighth resistor.

7. The power source circuit of claim 1, wherein the switch circuit comprises a operating voltage source having a operating voltage, a transistor, and a relay; the relay comprises a first relay node, a second relay node, a third relay node, and a fourth relay node, the third relay node is connected to the fourth relay node when the first relay node and the second relay node are connected between the operating voltage and the ground; the base of the transistor is connected to the control input node, the emitter of the transistor is connected to the ground, the collector of the transistor is connected to the first relay node, the third relay node is connected to the second connection node, the fourth relay node is connected to the first connection node.

8. The power source circuit of claim 7, wherein the switch circuit further comprises a second diode, a fourth capacitor to a seventh capacitor, and a tenth resistor to a twelfth resistor; the tenth resistor and the fourth capacitor are connected between the control input node and the ground in parallel, the eleventh resistor and twelfth resistor are connected between the second relay node and the operating voltage source in parallel, the anode of the second diode is connected to the collector of the transistor, the cathode of the second diode is connected to the first relay node, two ends of the fifth capacitor is respectively connected to the anode and the cathode of the second diode, the sixth capacitor is connected between the operating voltage source and the ground.

* * * * *